US011758594B2

(12) United States Patent
Fujita (10) Patent No.: US 11,758,594 B2
(45) Date of Patent: Sep. 12, 2023

(54) COMMUNICATION APPARATUS, METHOD OF CONTROLLING THE SAME, AND STORAGE MEDIUM

(71) Applicant: CANON KABUSHIKI KAISHA, Tokyo (JP)

(72) Inventor: Shunji Fujita, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 646 days.

(21) Appl. No.: 16/143,792

(22) Filed: Sep. 27, 2018

(65) Prior Publication Data
US 2019/0104557 A1    Apr. 4, 2019

(30) Foreign Application Priority Data
Oct. 2, 2017   (JP) .................................. 2017-192832

(51) Int. Cl.
*H04W 76/14* (2018.01)
*H04W 4/80* (2018.01)
(Continued)

(52) U.S. Cl.
CPC ............. *H04W 76/14* (2018.02); *H04W 4/80* (2018.02); *H04W 8/005* (2013.01);
(Continued)

(58) Field of Classification Search
CPC ... H04W 76/14; H04W 88/04; H04W 88/023; H04W 8/005; H04W 4/80; H04W 36/03;
(Continued)

(56) References Cited

U.S. PATENT DOCUMENTS

2006/0183090 A1*  8/2006  Nollan .................. G09B 17/00
                                                    434/178
2008/0182518 A1*  7/2008  Lo ..................... H04N 21/43632
                                                    455/41.3
(Continued)

FOREIGN PATENT DOCUMENTS

JP          2016-170608 A      9/2016

OTHER PUBLICATIONS

Okomato et al. Targeted Advertising Using BLE Beacon, 2017 IEEE 6th Global Conference on Consumer Electronics (GCCE 2017) (Year: 2017).*

(Continued)

*Primary Examiner* — Yu-Wen Chang
(74) *Attorney, Agent, or Firm* — Cowan, Liebowitz & Latman, P.C.

(57) ABSTRACT

A communication apparatus includes a communication unit that repeatedly transmits an advertising signal, and a control unit that, in a case of being not connected with a central device via the communication unit, controls the communication unit to transmit an advertising signal that includes information based on not being connected with the central device, and, in a case of being connected to the central device via the communication unit, controls the communication unit to transmit an advertising signal that includes information based on being connected with the central device, when receiving from another central device a connection request with respect to an advertising signal that includes information based on being connected with the central device, the control unit disconnects a BLE connection with the connected central device, and establishes a BLE connection with the another central device.

19 Claims, 6 Drawing Sheets

(51) Int. Cl.
*H04W 8/00* (2009.01)
*H04W 88/02* (2009.01)
*H04W 88/04* (2009.01)
*H04W 76/23* (2018.01)
*H04W 84/18* (2009.01)
*H04W 76/30* (2018.01)
*H04W 40/24* (2009.01)
*H04W 36/00* (2009.01)

(52) U.S. Cl.
CPC ......... *H04W 40/246* (2013.01); *H04W 76/23* (2018.02); *H04W 76/30* (2018.02); *H04W 84/18* (2013.01); *H04W 88/023* (2013.01); *H04W 88/04* (2013.01); *H04W 36/03* (2018.08)

(58) Field of Classification Search
CPC ... H04W 76/23; H04W 76/30; H04W 40/246; H04W 40/24; H04W 84/18; H04W 36/0016; H04W 48/16
See application file for complete search history.

(56) References Cited

U.S. PATENT DOCUMENTS

| | | | | |
|---|---|---|---|---|
| 2012/0039213 A1* | 2/2012 | Cheng | ................... | H04W 76/12 370/254 |
| 2012/0084446 A1* | 4/2012 | Iinuma | ................. | H04W 36/00 709/227 |
| 2012/0275224 A1* | 11/2012 | Park | .................... | G11C 11/5628 365/185.11 |
| 2012/0302170 A1* | 11/2012 | Frazier | .................. | H04W 84/20 455/41.3 |
| 2013/0084911 A1* | 4/2013 | Chang | .................... | H04W 4/10 455/518 |
| 2015/0201455 A1* | 7/2015 | Redding | ................. | H04W 4/80 455/41.2 |
| 2015/0264138 A1* | 9/2015 | Watts, Jr. | ............ | H04L 67/1095 709/203 |
| 2015/0289081 A1* | 10/2015 | Chen | .................... | H04W 8/005 455/41.2 |
| 2016/0036953 A1* | 2/2016 | Lee | ......................... | H04M 1/05 455/426.1 |
| 2016/0227351 A1* | 8/2016 | Gu | ....................... | H04B 17/318 |
| 2016/0262193 A1* | 9/2016 | Hariharan | ............. | H04W 76/10 |
| 2017/0048911 A1* | 2/2017 | Ge | .......................... | H04W 4/00 |
| 2017/0154522 A1* | 6/2017 | Lim | ........................ | G08C 17/02 |
| 2017/0208424 A1* | 7/2017 | Longjie | ................. | H04W 76/14 |
| 2018/0017946 A1* | 1/2018 | Kyou | .................... | H04W 8/005 |
| 2018/0063145 A1* | 3/2018 | Cayton | ................. | H04L 63/101 |
| 2018/0159930 A1* | 6/2018 | Watts | ..................... | H04L 67/28 |

OTHER PUBLICATIONS

Mattila et al., "Advertising semantically described physical items with Bluetooth Low Energy beacons", Budva, Montenegro, MECD-2013 (Year: 2013).*
Elke Mackensen and Matthias Lai et al. "Bluetooth Low Energy (BLE) based wireless sensors" (Year: 2012).*

* cited by examiner

| HEADER | | | | | PAYLOAD | |
|---|---|---|---|---|---|---|
| PDU Type (ADV_IND) | RFU | TxAdd | RxAdd | Length | RFU | AdvA | AdvData |

FIG. 4B

| HEADER | | | | | PAYLOAD | |
|---|---|---|---|---|---|---|
| PDU Type (SCAN_REQ) | RFU | TxAdd | RxAdd | Length | RFU | ScanA | AdvA |

FIG. 4C

| HEADER | | | | | PAYLOAD | |
|---|---|---|---|---|---|---|
| PDU Type (SCAN_RSP) | RFU | TxAdd | RxAdd | Length | RFU | AdvA | ScanRspData |

FIG. 4D

| HEADER | | | | | PAYLOAD | | |
|---|---|---|---|---|---|---|---|
| PDU Type (CONNECT_REQ) | RFU | TxAdd | RxAdd | Length | RFU | InitA | AdvA | LLData |

FIG. 4E

| PAYLOAD | |
|---|---|
| Opcode (0x02) | CtrlData (ErrorCode) |

FIG. 5

WIRELESS EARPHONE (11-22-33-44-55-66) DETECTED.
*THE WIRELESS EARPHONE IS EXECUTING
A STREAMING TRANSFER SERVICE WITH
A SMART PHONE (22-33-44-55-66-77).

OUTPUT AUDIO OF VIDEO FILE FROM
WIRELESS EARPHONE?

| YES | NO |

"YES" : OUTPUT FROM A WIRELESS EARPHONE.
      *COMMUNICATION BETWEEN SMART PHONE AND
       A WIRELESS EARPHONE WILL BE DISCONNECTED.

"NO" : OUTPUT BY DIGITAL CAMERA BODY

FIG. 6A

| CONNECTION PRIORITY ORDER | DEVICE ADDRESS OF CENTRAL DEVICE |
|---|---|
| 1 | 12-34-56-78-90-ab |
| 2 | 22-33-44-55-66-77 |
| 3 | 23-45-67-89-0a-b1 |
| 4 | others |

FIG. 6B

| CONNECTION PRIORITY ORDER | SERVICE IDENTIFIER | SERVICE NAME |
|---|---|---|
| 1 | 0x1802 | EMERGENCY MESSAGE |
| 2 | 0x111E | TELEPHONE |
| 3 | 0x110B | AUDIO STREAMING |
| 4 | 0x1805 | TIME INFORMATION NOTIFICATION |
| 5 | others | ——— |

COMMUNICATION APPARATUS, METHOD OF CONTROLLING THE SAME, AND STORAGE MEDIUM

BACKGROUND OF THE INVENTION

Field of the Invention

The present invention relates to a communication apparatus that performs wireless communication, a method of controlling the same, and a storage medium.

Description of the Related Art

In recent years, there have been more devices equipped with a function conforming to a very low power consumption communication standard referred to as Bluetooth (registered trademark) Low Enemy (hereinafter referred to as BLE). In BLE communication, an apparatus operating as a peripheral (a peripheral device) transmits a packet referred to as an advertising packet every certain period to thereby inform its presence to an apparatus operating as a central (a central device). The central device, having received the advertising packet transmitted by the peripheral device, transmits to the peripheral device a connection request packet in response to the advertising packet to thereby establish a connection the peripheral device and execute various services.

Japanese Patent Laid-Open No. 2016-170608 (hereinafter, D1) discloses in regard to an information processing apparatus that transmits an advertising packet having content that differs in accordance with an operation mode. According to D1, an information processing apparatus, if operating in a normal operation mode, transmits an advertising packet for permitting transmission of a connection request by an external apparatus, and, if operating in a power saving mode, transmits an advertising packet for not permitting transmission of a connection request by an external apparatus.

However, D1 is something for permitting or prohibiting the generation of a connection request from an external apparatus, and does not give any consideration whatsoever to changing connections between a peripheral device and a plurality of central devices. In BLE communication, a peripheral device cannot connect to a plurality of central devices at the same time. Accordingly, in a case of changing the connection partner of a peripheral from a central device A to a central device B, operation is cumbersome as there is a need to first perform an operation for disconnecting an existing connection on the central device A side, and subsequently perform an operation on the central device B side for causing a connection to be established.

SUMMARY OF THE INVENTION

In one embodiment of the present invention, a communication apparatus for reducing the complexity of an operation when changing a connection state in wireless communication, and a method of controlling the same are described.

According to one aspect of the present invention, there is provided a communication apparatus, comprising: a communication unit configured to repeatedly transmit an advertising signal; and a control unit, wherein, in a case of being not connected with a central device via the communication unit, the control unit controls the communication unit to transmit an advertising signal that includes information based on not being connected with the central device, and, in a case of being connected to the central device via the communication unit, the control unit controls the communication unit to transmit an advertising signal that includes information based on being connected with the central device, and wherein, in a case of receiving from another central device a connection request with respect to an advertising signal that includes information based on being connected with the central device, the control unit disconnects a BLE connection with the connected central device, and establishes a BLE connection with the another central device.

According to another aspect of the present invention, there is provided a method of controlling a communication apparatus, the method comprising: using a communication unit to repeatedly transmit an advertising signal; and in a case of being not connected with a central device via the communication unit, controlling the communication unit to transmit an advertising signal that includes information based on not being connected with the central device, and, in a case of being connected to the central device via the communication unit, controlling the communication unit to transmit an advertising signal that includes information based on being connected with the central device, and wherein, in a case of receiving from another central device a connection request with respect to an advertising signal that includes information based on being connected with the central device, a BLE connection with the connected central device is disconnected, and a BLE connection with the another central device is established.

According to another aspect of the present invention, there is provided a non-transitory computer-readable storage medium storing a computer program for causing a computer to execute a control method, the control method comprising: using a communication unit to repeatedly transmit an advertising signal; and in a case of being not connected with a central device via the communication unit, controlling the communication unit to transmit an advertising signal that includes information based on not being connected with the central device, and, in a case of being connected to the central device via the communication unit, controlling the communication unit to transmit an advertising signal that includes information based on being connected with the central device, and wherein, in a case of receiving from another central device a connection request with respect to an advertising signal that includes information based on being connected with the central device, a BLE connection with the connected central device is disconnected, and a BLE connection with the another central device is established.

Further features of the present invention will become apparent from the following description of exemplary embodiments (with reference to the attached drawings).

DESCRIPTION OF THE EMBODIMENTS

With reference to the drawings, description is given in detail below regarding embodiments of the present invention.

<Internal Configuration of Peripheral Device and Central Device>

Figure 1:
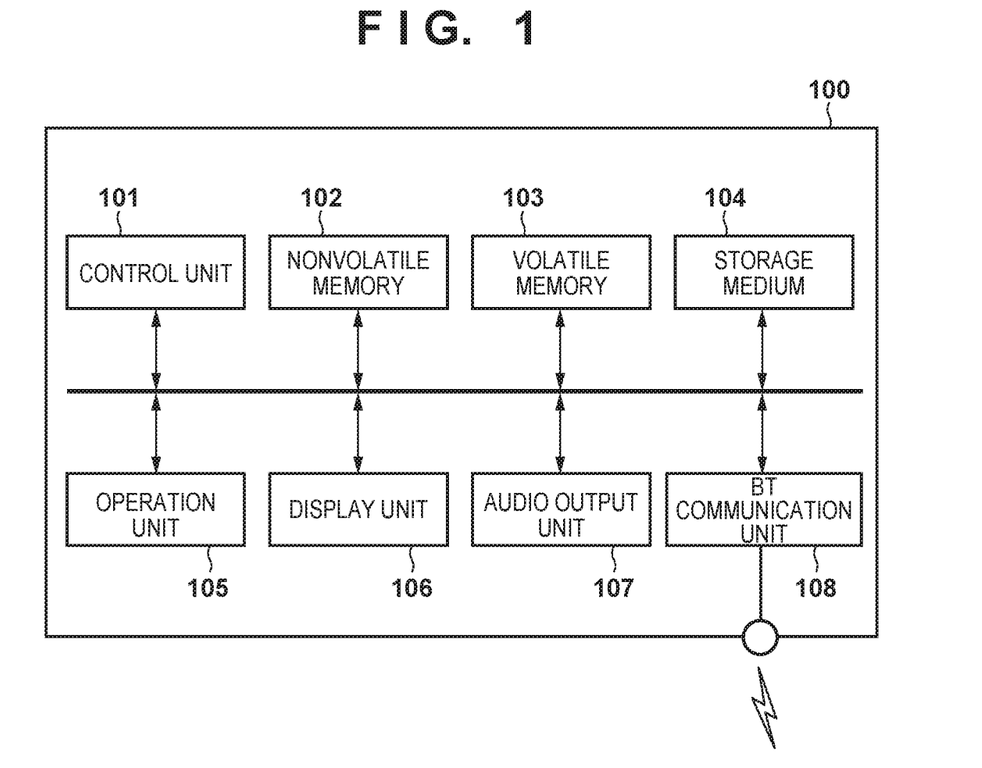
FIG. 1 is a block diagram that illustrates an example of an internal configuration of a peripheral device and a central device.

FIG. 1 is a view that illustrates an example of an internal configuration of a peripheral device and a central device in an embodiment. Description is given using the same view because a peripheral device and a central device can be implemented by a common functional block configuration. Below, a generic term for a peripheral device and a central device is a communication apparatus. Note that products such as a smart phone, a tablet, a digital camera, a smart watch, and a Bluetooth (registered trademark) earphone, for example, can be adapted as a peripheral device or a central device.

In FIG. 1, a control unit 101 of a communication apparatus 100 controls all processing blocks by executing a control program stored in a non-volatile memory 102. The control unit 101 is configured by one or a plurality of processors such as a CPU or an MPU. The non-volatile memory 102 stores, for example, the control program executed by the control unit 101. A volatile memory 103 is used as a work memory for the control unit 101 to execute the control program. A storage medium 104 stores data to be transferred by a BT communication unit 108, various parameters regarding transfer, or the like. The storage medium 104 is configured by a large capacity flash memory, memory card, or the like, for example.

An operation unit 105 accepts an operation by a user, and transfers information corresponding to the accepted operation to the control unit 101. The operation unit 105 is configured by a touch panel, button switches, directional keys, or the like. A display unit 106 performs, under control by the control unit 101, a visible display for notifying information to a user. The display unit 106 is configured by a liquid crystal panel, an LED, or the like, for example. An audio output unit 107 controls output of audio for notifying information to a user. The audio output unit 107 is configured by a speaker or the like, for example. The BT communication unit 108 controls wireless communication that complies with a BLE standard. In the case where the communication apparatus 100 is a peripheral device, the BT communication unit 108 operates as a BLE peripheral, and when the communication apparatus 100 is a central device, the BT communication unit 108 operates as a BLE central.

<Network System Configuration>

Figure 2:
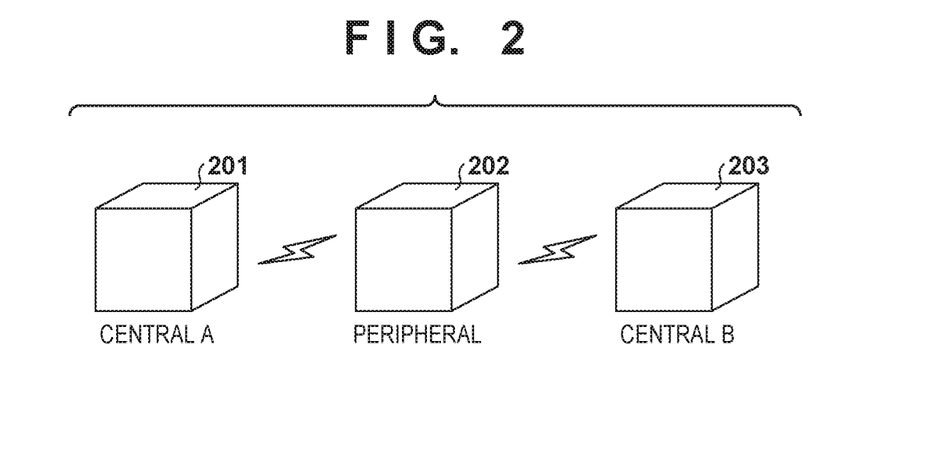
FIG. 2 is a view which illustrates an example of a system configuration in a network.

FIG. 2 is a view that illustrates an example of a system configuration of a network in the present embodiment. Reference numeral 201 indicates a central A device, reference numeral 202 indicates a peripheral device, and reference numeral 203 indicates a central B device. These devices are communication apparatuses provided with the internal configuration illustrated in FIG. 1. Note that the central A device 201 and the central B device 203 are physically separate devices.

In FIG. 2, the peripheral device 202 periodically broadcasts a packet referred to as an advertising packet to thereby notify its presence to central devices present in its vicinity, in the example of FIG. 2, it notifies its presence to the central A device 201 and the central B device 203 which are present in its vicinity. The central A device 201 and the central B device 203, having received the advertising packet from the peripheral device 202, transmit to the peripheral device 202 a connection request packet in response to the received advertising packet. The peripheral device 202 establishes a connection with a central device that transmitted a connection request packet. In this way, the peripheral device 202 can establish a connection with one of the central A device 201 and the central B device 203.

Note that the connection configuration in the BLE communication standard is a star, and it is not possible for the central A device 201 and the central B device 203 to simultaneously establish a connection with the peripheral device 202. What can establish a connection is invariably one of the central A device 201 and the central B device 203. For example, if the central A device 201 establishes a connection with the peripheral device 202 first, the central B device 203 cannot establish a connection with the peripheral device 202 while the central A device 201 maintains its connection. The central A device 201, which has established a connection with the peripheral device 202, can execute services provided by the peripheral device 202.

<Connection Change Processing Sequence>

Figure 3:
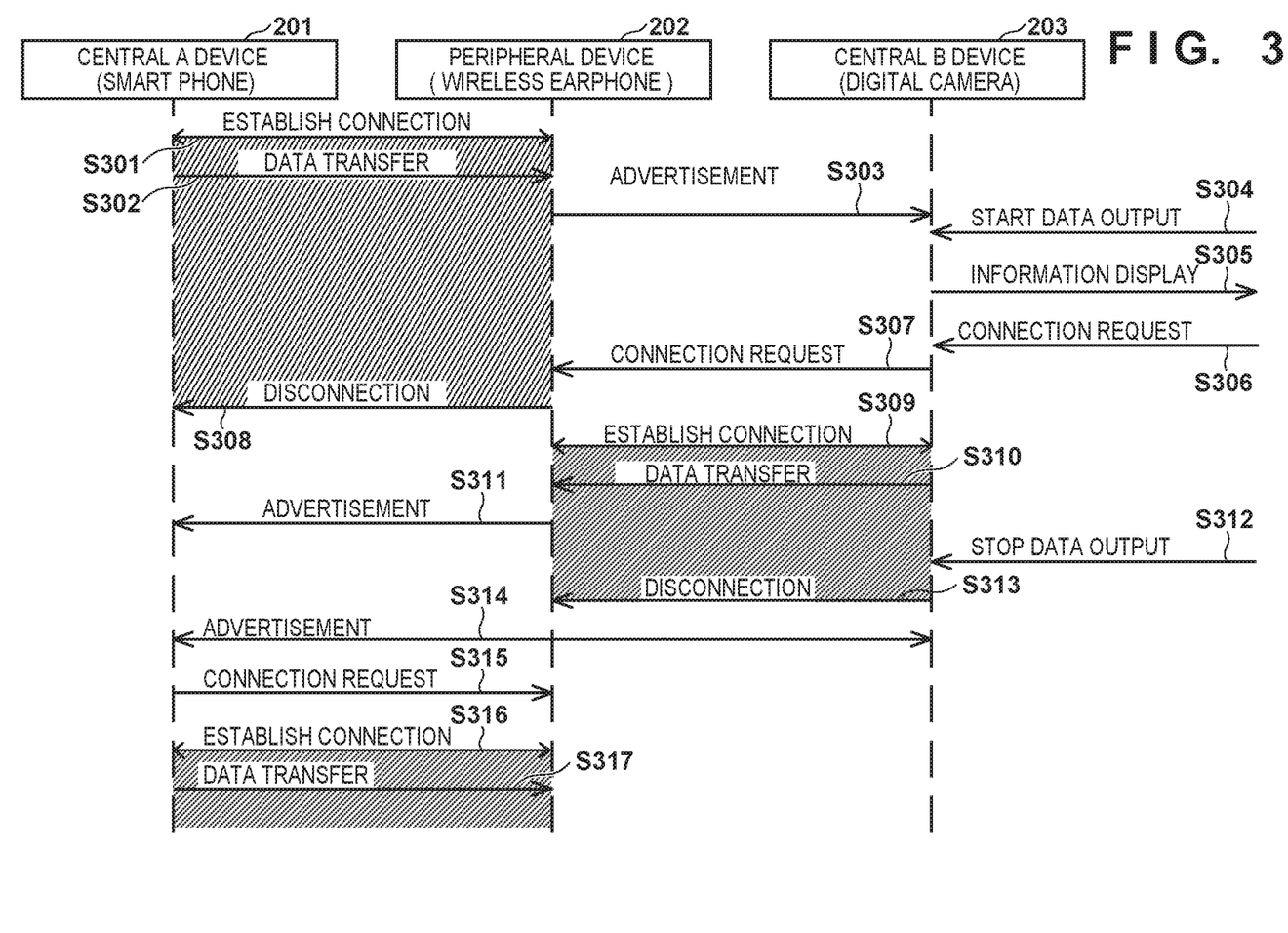
FIG. 3 is a view illustrating a sequence of connection change processing.

In the network system configuration illustrated in FIG. 2, processing for, when the peripheral device 202 and the central A device 201 have established a connection, changing the connection partner of the peripheral device 202 to the central B device 203 is described with reference to FIG. 3. Note that, in FIG. 3, as specific product configurations, description is given by envisioning a case where the central A device 201 is a smart phone, the peripheral device 202 is a wireless earphone, and the central B device 203 is a digital camera. Consequently, below the central A device 201 is written as the smart phone (201), the peripheral device 202 is written as the wireless earphone (202), and the central B device 203 is written as the digital camera (203). In FIG. 3, areas indicated by hatching indicate periods where a connection in accordance with BLE communication has been established. Note that respective processing (steps) illustrated in FIG. 3 is executed by the respective control units 101 of the smart phone (201), the wireless earphone (202), and the central B device 203.

In the sequence illustrated in FIG. 3, firstly, in step S301, a connection for BLE communication is established between the smart phone (201) and the wireless earphone (202). In step S302, the smart phone (201), in accordance with a music reproduction application that is executed therein, uses the BLE communication to start streaming transmission of audio data to the wireless earphone (202).

In step S303, the wireless earphone (202), while receiving the audio data transmitted from the smart phone, periodically transmits an advertising packet that includes communication related information concerning the BLE communication the smart phone (201). The communication related information concerning the BLE communication is specifically information for identifying the smart phone (201) and information concerning a service executed with the smart phone (201).

Figure 4A:
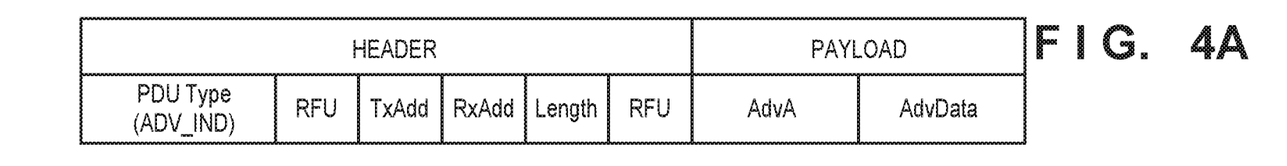
FIGS. 4A through 4E are views for illustrating examples of packet formats.

FIG. 4A illustrates a format example of the advertising packet transmitted in step S303. FIG. 4A indicates the format of an ADV_IND packet which is one packet out of ADVERTISING CHANNEL PDU defined by a BLE standard. As illustrated by FIG. 4A, an advertising packet is configured by a header portion and a payload portion. The header portion is common in ADVERTISING CHANNEL PDU. The payload is configured by AdvA and AdvData.

AdvA is a device address of a device of the side transmitting the advertising packet, and in this step stores the device address of the wireless earphone which is the peripheral device 202. Note that a device address is identification information of a BLE apparatus. AdvData is an arbitrary data region of a maximum of 31 octets. In the present embodiment, the aforementioned communication related information concerning the BLE communication with the smart phone (201) is stored in AdvData. Here, in a case where the amount of information stored is large and cannot fit in the AdvData region, remaining information is stored in ScanRspData of a scan response packet.

Figure 4B:
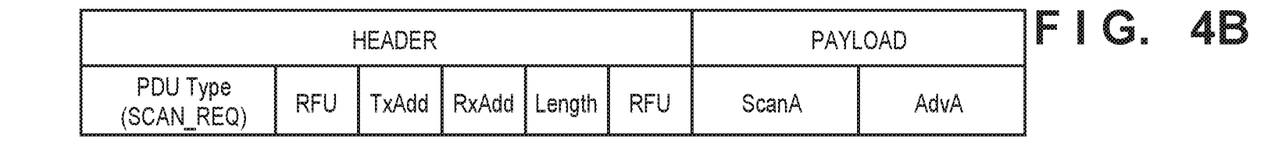

The scan response packet is a packet transmitted as a response thereto by the wireless earphone (202) to the digital camera (203) when a scan request packet is transmitted from the digital camera (203) as a response to reception of the advertising packet. FIG. 4B illustrates an example of the format of a scan request packet. FIG. 4B indicates the format of a SCAN_REQ packet which is one packet out of ADVERTISING CHANNEL PDU defined by a BLE standard. As illustrated by FIG. 4B, the payload of a SCAN_REQ packet is configured by ScanA and AdvA. ScanA is a device address of a device that transmits a scan request packet, and, in the present example, stores the device address of the digital camera (203). AdvA is similar to AdvA of an ADV_IND packet, and, in the present example, stores the device address of the wireless earphone (the peripheral device 202).

Figure 4C:
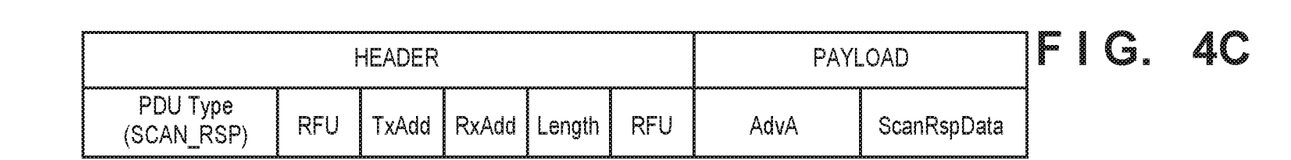

FIG. 4C illustrates an example of the format of a scan response packet. FIG. 4C indicates the format of a SCAN_RSP packet which is one packet out of ADVERTISING CHANNEL PDU defined by a BLE standard. As illustrated by FIG. 4C, the payload of a SCAN_RSP packet is configured by AdvA and ScanRspData. AdvA is similar to AdvA of an ADV_IND packet, and, in the present example, stores the device address of the wireless earphone (202). ScanRspData is an arbitrary data region of a maximum of 31 octets. In the present example, the aforementioned information concerning the BLE communication with the smart phone (201) is stored in ScanRspData. Note that configuration may be taken such that ScanRspData stores only a portion that could not fit in AdvData of an advertising packet.

Returning to referring to FIG. 3, in step S304, the digital camera (203) accepts a request to start processing for outputting audio data in accordance with an operation by a user (for example, an operation instructing playback of a video file). In step S305, the digital camera (203) displays a selection screen concerning the connection with the wireless earphone (202) to a user, based on the information concerning the BLE communication between the wireless earphone (202) and the smart phone (201) received in step S303.

Figure 5:
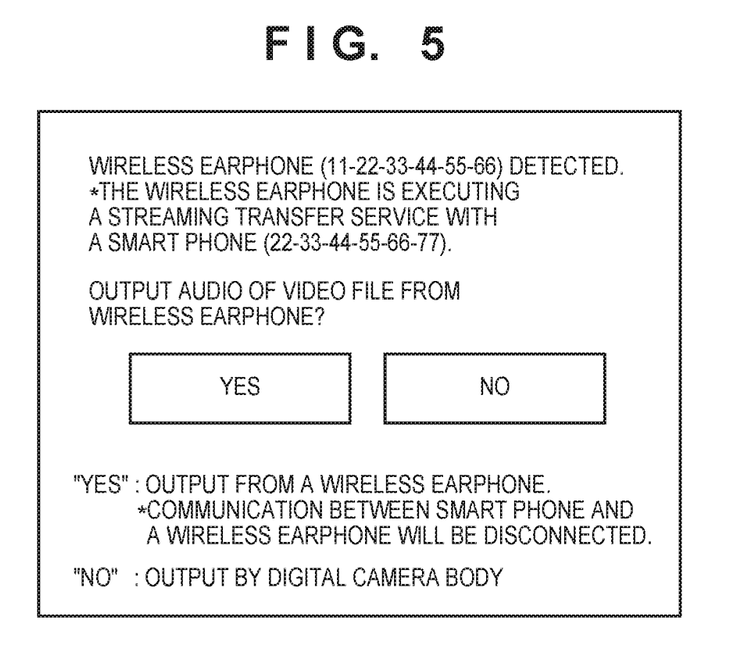
FIG. 5 is a view which illustrates an example of a selection screen.

FIG. 5 illustrates an example of the selection screen displayed in step S305. In FIG. 5, "11-22-33-44-55-66" is a device address of the wireless earphone (202), and is information obtained from AdvA of the advertising packet. In addition, "22-33-44-55-66-77" is the device address of the smart phone (201), and is information obtained from the communication related information written in ScanRspData of the scan response packet or AdvData of the advertising packet. In addition, the "streaming transfer service" in FIG. 5 is information obtained from the communication related information written in ScanRspData of the scan response packet or AdvData of the advertising packet.

In step S306, the digital camera (203) accepts an operation by a user that requests a connection with the wireless earphone (202). This corresponds to the case where "YES" in the selection screen of FIG. 5 is selected. Upon accepting the operation from a user that requests a connection, the digital camera (203), in step S307, transmits a connection request packet to the wireless earphone (202).

Figure 4D:
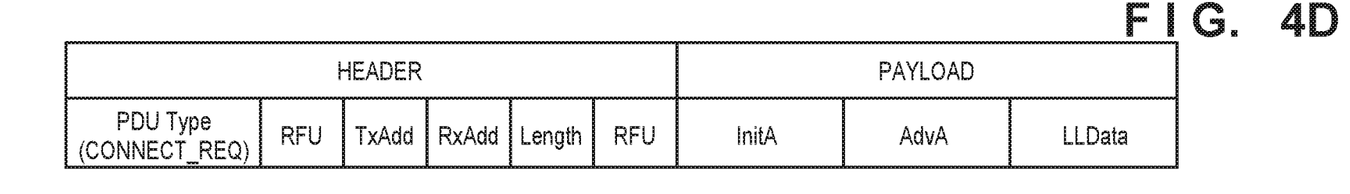

FIG. 4D illustrates an example of the format of a connection request packet. FIG. 4D indicates the format of a CONNECT_REQ packet which is one packet out of ADVERTISING CHANNEL PDU defined by a BLE standard. As illustrated by FIG. 4D, the payload of a CONNECT_REQ packet is configured by InitA, AdvA, and LLData. InitA is a device address of a device that transmits a connection request packet, and, in the present example, stores the device address of the digital camera (203). AdvA is similar to AdvA of an ADV_IND packet, and, in the present example, stores the device address of the wireless earphone (202) which is a peripheral device. LLData is a setting parameter for a time of establishing a connection, and, in the present example, stores a predetermined setting in accordance with the digital camera (203).

In step S308, in response to receiving the connection request packet from the digital camera (203), the wireless earphone (202) transmits a disconnection packet to the smart phone (201), and disconnects the connection with the smart phone (201).

Figure 4E:
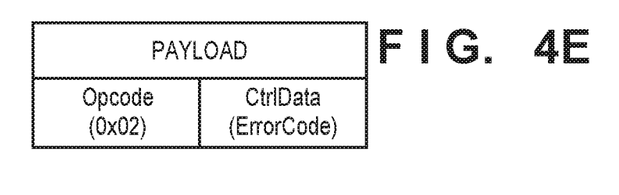

FIG. 4E illustrates a format of a disconnection packet. FIG. 4E illustrates a format of a LL_TERMINATE_IND packet that is one type of LL CONTROL PDU defined in a BLE standard. As illustrated by FIG. 4E, the payload of LL_TERMINATE_IND is configured by Opcode and CtrlData. Opcode stores 0x02 which indicates LL_TERMINATE_IND. CtrlData stores ErrorCode which indicates a reason for the disconnection. In the present example, an ErrorCode indicating "disconnection due to change" is stored. Note that a value treated as "Reserved for Future Use" in a BLE standard is used for the ErrorCode to indicate "disconnection due to change".

Upon disconnecting communication with the smart phone (201), the wireless earphone (202), in step S309, establishes a connection with the digital camera (203) as a response to the connection request from the digital camera (203) that was received in step S307. In step S310, the digital camera (203) starts a streaming transfer of audio data of the video file, for which playback started in step S304, to the wireless earphone (202). The wireless earphone (202) outputs the received audio data. Upon receiving a connection request in this way from the digital camera (203) (step S307), the wireless earphone (202) disconnects a wireless communication connection with the smart phone (201) (step S308), and establishes a wireless communication connection with the digital camera (203) (step S309). In this way, the wireless earphone (202) changes a wireless communication connection state.

In step S311, the wireless earphone (202), while receiving the audio data transmitted from the digital camera (203), periodically transmits an advertising packet that includes communication related information concerning the BLE communication with the digital camera (203). The communication related information concerning the BLE communication is specifically information for identifying the digital camera (203) and information concerning a service executed with the digital camera (203). Because a method for storing the communication related information is similar to that of step S303, description thereof is omitted.

In step S312, the digital camera (203) accepts a request to stop output of audio data in accordance with an operation by a user. An operation that a user makes to stop playback of a video file is an example of such a user operation. Upon accepting the request to stop output of audio data, in step S313, the digital camera (203) transmits a disconnection packet to the wireless earphone (202), and disconnects the connection. The format of the disconnection packet transmitted here is similar to that of FIG. 4E previously described. However, ErrorCode indicating a normal disconnection is stored in CtrlData here. Specifically, "0x13 (Remote User Terminated Connection" treated as "Reserved for Future Use" defined in a BLE standard is stored.

In step S314, the wireless earphone (202) transmits an advertising message that does not include communication related information. This advertising message, for example, is one that excludes the communication related information concerning BLE communication with the digital camera (203) described above from the advertising message for which transmission started in step S311. In other words, when a wireless communication connection is not established with another communication apparatus, the wireless earphone (202) transmits an advertising message that does not include communication related information. In step S315, the smart phone (201) detects, in accordance with the advertising message received in step S314, that the wireless earphone (202) does not have a connection by BLE with the digital camera (203). The smart phone (201) then transmits a connection request packet to the wireless earphone (202) in response to this detection. In step S316, the wireless earphone (202) establishes a connection with the smart phone (201) in response to step S315. In step S317, the smart phone (201) resumes streaming audio data to the wireless earphone (202).

With reference to FIG. 3, description was given above regarding an embodiment for processing for changing a connection partner of the wireless earphone (202) from the smart phone (201) to the digital camera (203). By virtue of the present embodiment, a user can change the connection partner of the wireless earphone (202) by operating only the digital camera (203). In addition, it is possible to return the connection partner of the wireless earphone (202) to the smart phone (201) without a user operating the smart phone (201), at a timing when a user operation of the digital camera (203) ends.

Note that, the processing sequence illustrated in FIG. 3 is an example of a peripheral device and central devices according to an embodiment, and various changes are possible to the extent that there is no deviation from the spirit of the present invention. For example, the wireless earphone (202), at a timing before step S301 (when no connection with any device has been established), may transmit an advertising packet with the same content as in step S314 (in other words, an advertising packet that does not include communication related information). In addition, in step S305 and step S306, there is a configuration for causing a user to manually determine whether to change the connection partner of the wireless earphone (202) to the digital camera (203), but there is no limitation to this. For example, configuration may be taken to share in advance among central devices a management table that defines, for each device address, a priority order for connections with the wireless earphone (202), to thereby make the determination automatically.

Figure 6A:
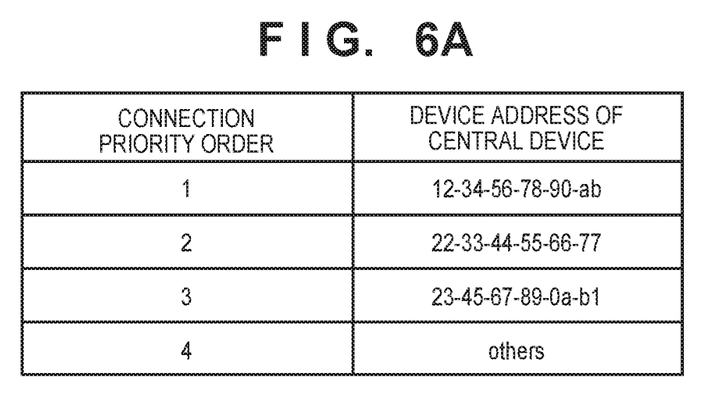
FIGS. 6A and 6B are views for illustrating an example of a priority order management table.

FIG. 6A illustrates an example of a management table that defines, for each device address, the priority order for a connection. This management table is a table that associates device addresses (identification information) and connection priority orders. The digital camera (203) determines whether to make a connection request with reference to this table. The connection priority order in FIG. 6A indicates that the smaller the value the higher the priority order. In FIG. 6A, for example, when the device address of the smart phone (201) included in the advertising packet received in step S303 is "22-33-44-55-66-77", the connection priority order of the smart phone (201) is "2". By comparing the connection priority order of the smart phone (201) and the connection priority order of its own device address, the digital camera (203) can automatically determine whether to change the connection partner without intermediation by a user operation. For example, if the connection priority order of the device address of the digital camera (203) is "1" and the connection priority order of the smart phone (201) is "2", the digital camera (203) determines to change the connection partner of the wireless earphone (202). For example, if the connection priority order of the device address of the digital camera (203) is "3" and the connection priority order of the smart phone (201) is "2", the digital camera (203) determines not to change the connection partner of the wireless earphone (202).

Figure 6B:
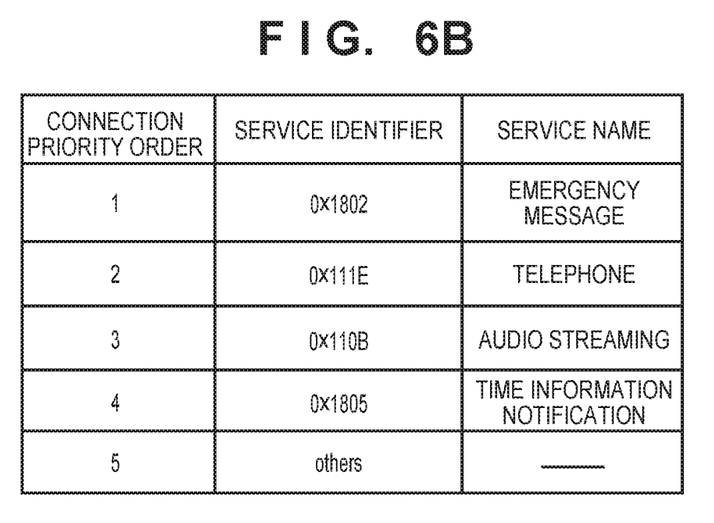

For example, configuration may be taken to share in advance among central devices a management table that defines, in accordance with the type of a service, a priority order for connections with the wireless earphone (202), to thereby automatically determine whether to change the connection partner of the wireless earphone (202). FIG. 6B illustrates an example of a management table. The management table of FIG. 6B is a table that associates services and connection priority orders. The digital camera (203) determines whether to make a connection request with reference to this table. The connection priority order in FIG. 6B indicates that the smaller the value the higher the priority order. In FIG. 6B, for example, if a service executed by the digital camera (the central B device 203) in step S304 is audio streaming, its connection priority order is "3". By comparing this with the connection priority order of the service being executed between the smart phone (the central A device 201) and the wireless earphone (the peripheral device 202) detected in step S303, it is possible to automatically make the determination without intermediation by a user operation.

As described above, in the embodiment described above, the peripheral device 202, in a state of being connected to the central A device 201, transmits an advertising packet that includes communication related information concerning communication with the central A device 201. The central B device 203 determines whether or not to change the connection to the peripheral device 202 based on the communication related information included in the advertising packet. Consequently, in a case of changing the connection partner of the peripheral device 202 from the central A device 201 to the central B device 203, a user can realize a change of the connection state by operating the central B device 203. Accordingly, it is possible to provide a connecting change that is highly convenient for the user.

Note that, configuration may be taken to input, into the connection request transmitted in step S307, specific information representing that a change of the connection state according to the present embodiment will be performed. The peripheral device 202 changes the connection state upon receiving a connection request that includes such specific information from the central B device 203 which has not established a connection, and ignores the connection request when the connection request does not include such specific information. In this way, it is possible to prevent a change of the connection state from being executed unintentionally in a case where there is a central device that immediately performs a connection request in response to advertising.

Other Embodiments

In the embodiments described above, description was given regarding an example in which a user of the digital camera (203) decides whether to transmit a connection request in accordance with the content of advertising by the wireless earphone (202). In other words, in the embodiments described above, whether to change a BLE wireless communication connection destination of the wireless earphone (202) to the digital camera (203) is decided in accordance with an operation with respect to the digital camera (203) However, the embodiments of the present invention are not limited to this. For example, as described below, configuration may be taken such that whether to change the BLE wireless communication connection destination of the wireless earphone (202) is decided in accordance with an operation on the smart phone (201).

Upon receiving a connection request transmitted from the digital camera (203) in response to an advertising signal transmitted by the wireless earphone (202), the wireless earphone (202) notifies the smart phone (201), which is the central device to which it is connected, that it has accepted a connection request from the digital camera (203). In response to this, the smart phone (201) notifies something to that effect to a user of the smart phone (201). For example, a message such as "A request to use the wireless earphone has been received from another device. Permit?" is displayed on a screen. When a user inputs an instruction to permit, something to that effect is transmitted from the smart phone (201) to the wireless earphone (202). When a user inputs an instruction indicating no permission, something to that effect is transmitted from the smart phone (201) to the wireless earphone (202). The wireless earphone (202), having received the instruction for permitting use, disconnects communication with the smart phone (201), and establishes BLE communication with the digital camera (203). In contrast, upon receiving an instruction for not permitting use, the wireless earphone (202) rejects or ignores the connection request from the digital camera (203), and maintains BLE communication with the smart phone (201).

Furthermore, when the smart phone (201) is executing a specific service such as a telephone service, even if the message of "A request to use the wireless earphone has been received from another device. Permit?" is displayed on the screen, it is seems unlikely that the user would respond thereto so as to change the connection partner, and it is thought that doing so would to be an impediment to a call. Accordingly, when the smart phone (201) is executing a specific service such as a telephone service, even if a connection request transmitted from the digital camera (203) is received in response to an advertising signal transmitted from the wireless earphone (202), the connection request from the digital camera (203) is rejected or ignored without requesting the smart phone (201) for permission, and the BLE communication with the smart phone (201) is maintained.

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-192832, filed Oct. 2, 2017 which is hereby incorporated by reference herein in its entirety.

What is claimed is:

1. A communication apparatus, comprising:
   a communication unit configured to repeatedly broadcast an advertising signal; and
   a control unit,
   wherein, in a case of being connected with a first central device via the communication unit, the control unit controls the communication unit to broadcast an advertising signal that includes information based on the communication apparatus being connected with the first central device, and, in a case of not being connected to the first central device via the communication unit, the control unit controls the communication unit to broadcast an advertising signal that does not include the information, and
   wherein, in response to receiving from a second central device a connection request in response to an advertising signal that includes information based on the communication apparatus is being connected with the first central device, the control unit disconnects a BLE connection with the connected first central device, and establishes a BLE connection with the second central device,
   wherein the control unit is implemented by one or more processor.

2. The communication apparatus according to claim 1, wherein
   in a case of receiving from the second central device a connection request with respect to an advertising signal that does not include the information, the control unit establishes a BLE connection with the second central device.

3. The communication apparatus according to claim 1, wherein the information includes one of information indicating being connected, information indicating that a predetermined service is being executed, information indicating being connected to a predetermined central device, and a device address of the connected predetermined central device.

4. The communication apparatus according to claim 1, wherein, upon receiving a connection request from the second central device in a state of being connected to the first central device, permission to change the connection is requested of the connected first central device.

5. The communication apparatus according to claim 1, wherein, upon receiving a connection request from the second central device in a state of being connected to the first central device, permission to change to the second central device is requested if the connected first central device is executing a predetermined service, and if the connected first central device is not executing the predetermined service, the communication apparatus connects to the second central device.

6. The communication apparatus according to claim 5, wherein the predetermined service is a telephone service.

7. The communication apparatus according to claim 1, wherein, upon receiving a connection request from the second central device in a state of being connected to the first central device, permission to change to the second central device is requested if the connected first central device is executing a predetermined service, and if the connected first central device is not executing the predetermined service, the communication apparatus changes connection to the second central device without requesting permission.

8. The communication apparatus according to claim 1, wherein the communication apparatus operates as a Bluetooth Low Energy peripheral device.

9. The communication apparatus according to claim 1, further comprising a speaker configured to generate audio in response a service executed with the central device.

10. A method of controlling a communication apparatus, the method comprising:
   using a communication unit to repeatedly transmit an advertising signal; and
   in a case of being connected with a first central device via the communication unit, controlling the communication unit to broadcast an advertising signal that includes information based on the communication apparatus being connected with the first central device, and, in a case of not being connected to the first central device via the communication unit, controlling the communication unit to broadcast an advertising signal that does not include the information, and
   wherein, in response to receiving from a second central device a connection request in response to an advertising signal that includes information based on the communication apparatus being connected with the first central device, a BLE connection with the connected first central device is disconnected, and a BLE connection with the second central device is established.

11. The method according to claim 10, wherein
   in a case of receiving from the second central device a connection request with respect to an advertising signal that does not include the information, the BLE connection with the connected first central device is disconnected, and a BLE connection with the second central device is established.

12. The method according to claim 10, wherein the information includes one of information indicating being connected te, information indicating that a predetermined service is being executed, information indicating being connected to a predetermined central device, and a device address of the connected predetermined central device.

13. The method according to claim 10, wherein, upon receiving a connection request from the second central device in a state of being connected to the first central device, permission to change the connection is requested of the connected first central device.

14. The method according to claim 10, wherein, upon receiving a connection request from the second central device in a state of being connected to the first central device, permission to change to the second central device is requested if the connected first central device is executing a predetermined service, and if the connected first central device is not executing the predetermined service, the communication apparatus connects to the second central device.

15. The method according to claim 14, wherein the predetermined service is a telephone service.

16. The method according to claim 10, wherein, upon receiving a connection request from the second central device in a state of being connected to the first central device, permission to change to the second central device is requested if the connected first central device is executing a predetermined service, and if the connected first central device is not executing the predetermined service, the communication apparatus changes connection to the second central device without requesting permission.

17. The method according to claim 10, wherein the communication apparatus operates as a Bluetooth Low Energy peripheral device.

18. The method according to claim 10, wherein the communication apparatus further comprises a speaker configured to generate audio in response a service executed with the central device.

19. A non-transitory computer-readable storage medium storing a computer program for causing a computer to execute a control method, the control method comprising:
   using a communication unit to repeatedly transmit an advertising signal; and
   in a case of being connected with a first central device via the communication unit, controlling the communication unit to broadcast an advertising signal that includes information based on the communication apparatus is being connected with the first central device, and, in a case of not being connected to the first central device via the communication unit, controlling the communication unit to broadcast an advertising signal that does not include the information, and
   wherein, in response to receiving from a second central device a connection request in response to an advertising signal that includes information based on the communication apparatus is being connected with the first central device, a BLE connection with the connected first central device is disconnected, and a BLE connection with the second central device is established.

* * * * *